Aug. 8, 1967  JEAN-FRANCOIS LAURENT ETAL  3,335,034
ELECTRODES FOR FUEL CELLS AND THE LIKE AND
PROCESS FOR THEIR MANUFACTURE
Filed Aug. 2, 1962  3 Sheets-Sheet 1
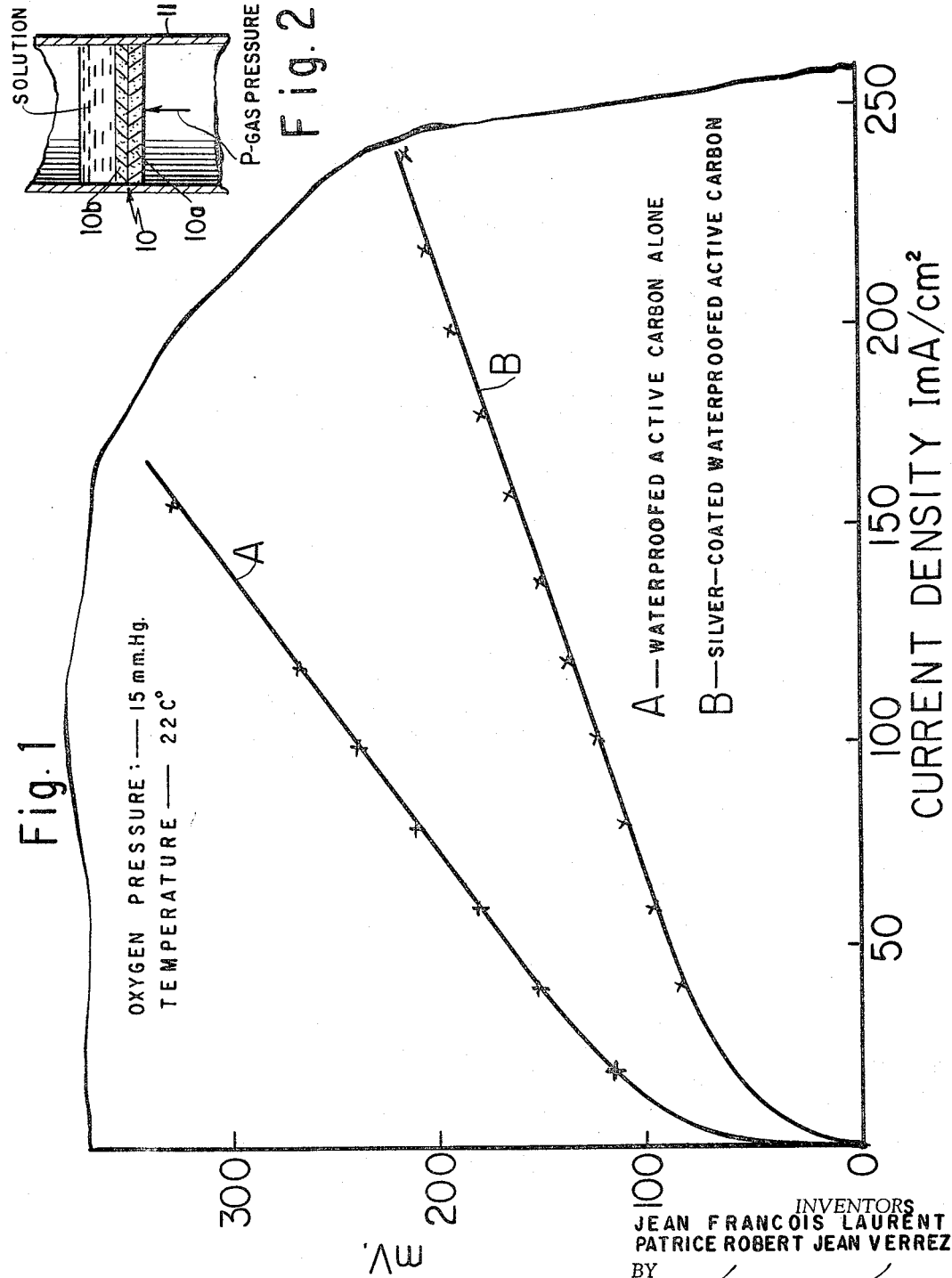
INVENTORS
JEAN FRANCOIS LAURENT
PATRICE ROBERT JEAN VERREZ
BY
ATTORNEYS

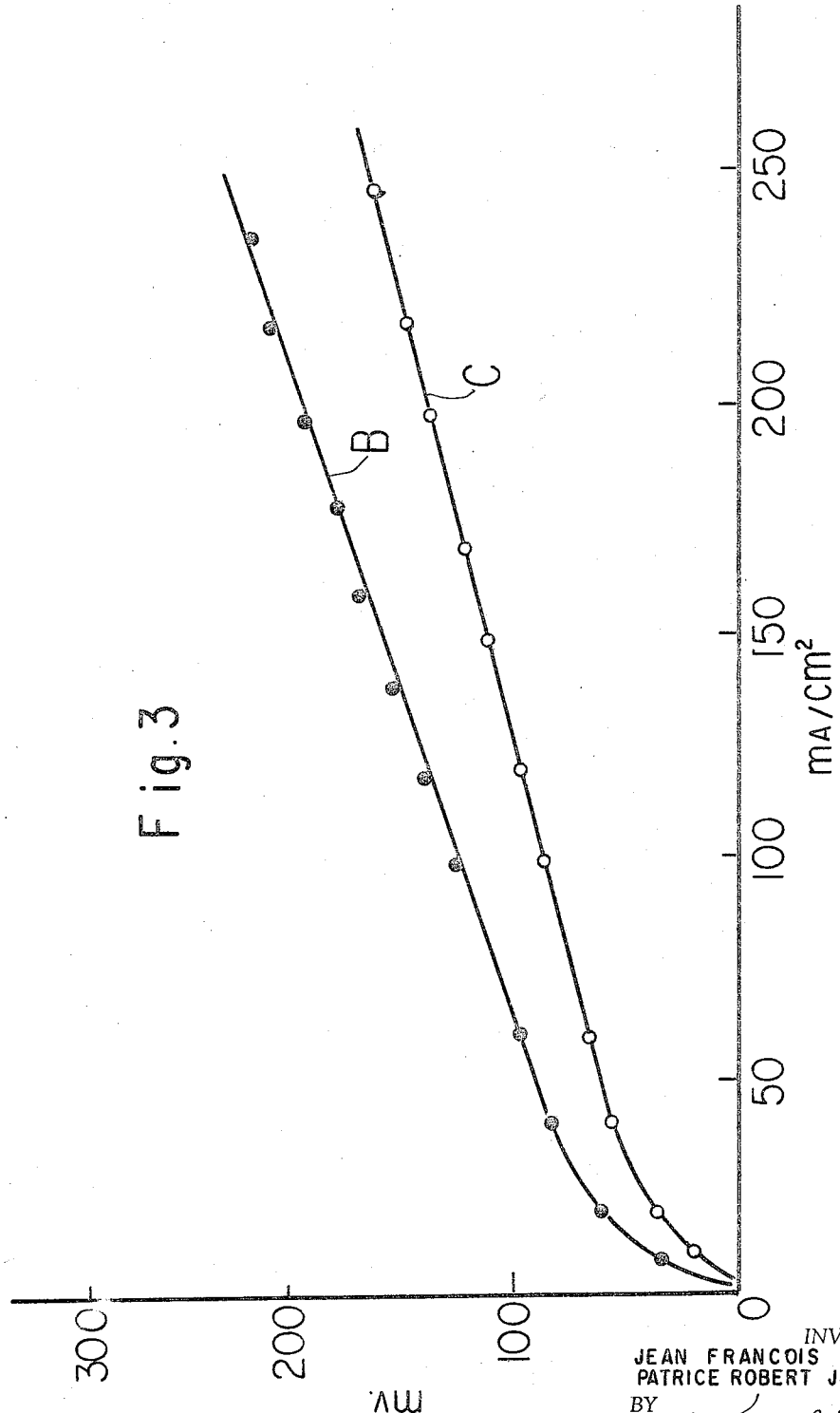

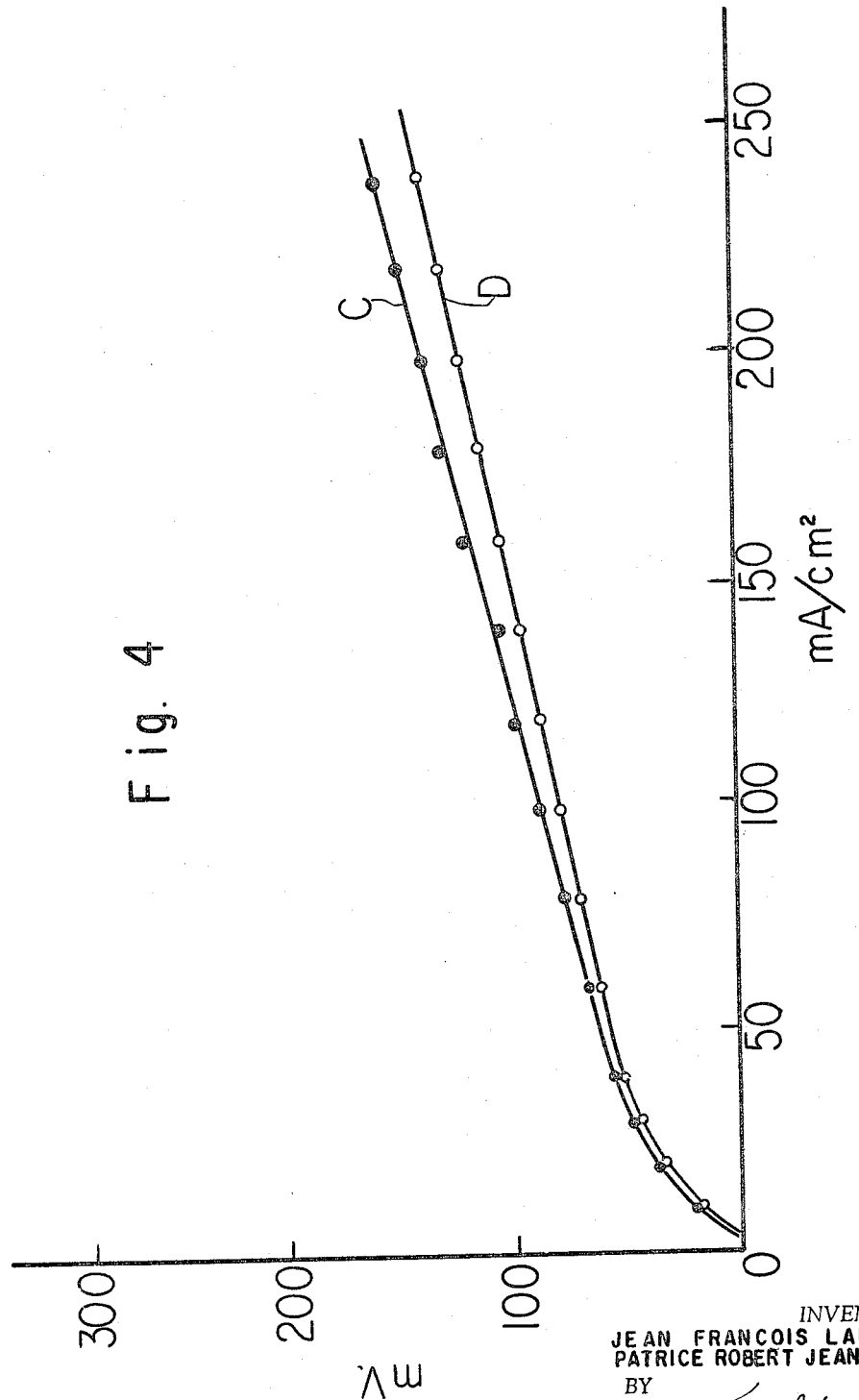

United States Patent Office 3,335,034
Patented Aug. 8, 1967

3,335,034
ELECTRODES FOR FUEL CELLS AND THE LIKE
AND PROCESS FOR THEIR MANUFACTURE
Jean-François Laurent, Pavillons-sous-Bois, and Patrice
Robert Jean Verrez, Paris, France, assignors to Societe
des Accumulateurs Fixes et de Traction (Société Anonyme) Romainville, France, a French company
Filed Aug. 2, 1962, Ser. No. 214,327
Claims priority, application France, Aug. 2, 1961,
869,888; Apr. 5, 1962, 893,484
23 Claims. (Cl. 136—120)

The present invention relates to electrodes useful particularly, but not exclusively, in fuel cells and similar devices and to processes for their manufacture.

The utilization in fuel cells of double-porosity electrodes, that is to say, electrodes comprising very fine pores and relatively large pores, is known. In these electrodes, the gases arrive through the larger pores. The electrolyte contained therein is consequently driven out by the gases owing to an overpressure provided to this end. The section of the electrode that is made up of the fine pores remains electrolyte-saturated and forms the center of the electro-chemical reaction that enables the gases to enter the electrolyte in the ionized state. Since the gaseous overpressure is inadequate to permit the gases to expel the electrolyte from the fine pores, loss of gas in the form of non-reacting bubbles is thus avoided.

However, electrodes of this type require an adjustment of the gaseous overpressure that proves to be quite delicate. Indeed, this overpressure must be adequate to expel the electrolyte from the larger pores but must remain sufficiently weak lest the gases tend to pass through the fine pores. In addition, manufacture of electrodes of this type is rather difficult and does not permit a production on an industrial scale.

The process according to the present invention makes it possible to remedy these various drawbacks. It is characterized in particular in that the electrode is rendered partially waterproof.

According to another characteristic of the invention, the desired waterproofing effect is achieved through a partial coating of the grains forming the electrode by means of a thin porous layer of a suitable material such as, for instance, a synthetic material or by the depositing of a similar layer over the walls of the pores.

According to another characteristic of the invention, the non-waterproofed section of the electrode is coated with a layer of material or a metal having catalytic properties.

The advantages achieved by the process of the invention can immediately be seen. First, it is no longer necessary that the gas should expel the electrolyte contained in the electrode pores in order to permit the effecting of the reaction that is to occur in the presence of the electrolyte and the catalytic support. Overpressure is no longer necessary to force back the electrolyte since the gases arrive through the waterproofed section devoid of electrolyte. A slight overpressure may be appropriate to compensate for loss of pressure of the gases during their passage through the pores. On the other hand, the electrolyte permeates the non-waterproofed section of the electrode and it need not be feared that the latter will be completely submerged since the capillary forces created by the waterproofed coating will counteract the electrolyte penetration. Furthermore, it is no longer necessary to provide pores of different dimensions and to comply with the strict observation of specifications in this matter.

Another object of the invention is to provide a process whereby the greatest possible number of active regions in the waterproofed portion as well as the catalytically coated section of the electrodes are produced.

Further objects and features of the invention are the use of special solvents having the lowest possible affinity for the material of the electrodes.

Other objects and features of the invention will become apparent from the following specification and the accompanying drawings forming a part hereof, wherein:

FIGURE 1 is a graph illustrating the advantages of an electrode prepared according to the invention as compared with another of similar type which does not incorporate the invention;

FIGURE 2 is a diagrammatic illustration of a manner of preparing an electrode embodying the invention;

FIGURE 3 is a graph illustrating advantages of this invention in an electrode utilizing a special solvent; and FIGURE 4 is a graph illustrating further advantages of a plated electrode embodying the invention.

The process in accordance with the invention can be applied in many different ways. It is possible in particular to use electrodes having a metallic sintered support or a support formed of active carbon, for example.

According to one mode of application, the waterproofed coating is achieved by partially impregnating an electrode, made for instance of a sintered metal such as nickel, with a solution of the selected synthetic material and by allowing the solvent to evaporate so that a thin and finely porous deposit of this material is formed on the walls of the pores, leaving however exposed the untouched portions of the said electrode.

To achieve waterproof impregnation, polystyrene dissolved in trichloroethylene or a substance with similar properties may be used. The catalytic coating of the non-waterproofed section of the electrode can be produced by impregnation with a solution of a metal salt and by means of a chemical or electrochemical reduction. The catalytic layer may have a thickness of 0.03–0.04 mm.

The waterproofed section of the electrode may present a degree of porosity that is the same as, or that is different from, that of the non-waterproofed section. Accordingly, pursuant to one mode of application, it is possible to provide in the non-waterproofed section pores with larger dimensions than in the waterproofed section. Likewise, the substances forming the two waterproofed and non-waterproofed sections may be of the same or of a different type. It is appropriate to point out that, in accordance with the invention and contrary to the action occuring in known double-porosity electrodes, the electrolyte-containing section is no longer required to have finer pores than that through which the gas arrival occurs. It follows therefrom that if it is desired to circulate the electrolyte in order to eliminate the used-up electrolyte, meaning generally the one diluted by water as a result of the operation of the cell, such circulation will be much easier and the electrolyte renewal will be more complete than in the case where it would be absorbed by fine pores from which it can only be expelled with difficulty.

According to one mode of application, the non-waterproofed section is provided with larger-size pores than the waterproofed one.

Regarding the selection of the plastic material, the nature of the electrolyte in which the electrode is to operate is to be taken into account.

As a non-limiting example, one embodiment of a method for manufacturing an oxygen electrode for fuel cells will now be described. An electrode made according to this embodiment produced excellent results. They are summarized in the annexed graph of FIGURE 1 which indicates its potential characteristic (ordinates) as a function of the discharged current density (abscissae).

In order clearly to show the advantages of the new electrode, it was not compared with a double porosity electrode, for with respect to the latter the advantages are obvious, as set forth above, but with an electrode of an entirely waterproofed type made, for example, according to the teachings of Emeriat U.S. application, Ser. No. 69,137, filed Nov. 14, 1960, now Patent No. 3,193,-414, issued July 6, 1965, and which comes closer to that of the invention. The two curves A of the latter electrode and B of the electrode of this invention clearly show the advantages of the electrode of this invention. Curve B shows that in a fuel cell the electrode of this invention is distinctly advantageous.

In the example selected, the electrode, made in accordance with the invention, comprises a porous plate of active carbon waterproofed by polystyrene and surface-coated along the electrolyte side with a thin film of 3 to 4/100 millimeter thick, non-waterproofed silver in the divided state, the said silver being produced by chemical reduction. It seems, on the basis of the results obtained, that this silver in the divided state is endowed with catalytic properties. It should be pointed out that, besides its waterproofing role, necessary to prevent the electrolyte from entering the porous carbon material, the waterproof coating, for example, polystyrene is useful in giving a certain cohesion to the material of the electrode thus improving the conditions for operation of the electrodes. In this way, the electrolyte penetrates into the silver layer only and the presence of the three phases (gaseous oxygen, solid, and electrolyte) required for the ionization process in the fuel cell is thus produced on the active carbon-silver interface.

EXAMPLE I

The electrode in question can, for instance, be manufactured as follows:

To begin with, a paste is prepared comprising, for instance, 100 parts of powdered active carbon, 90 parts of a 10% solution of polystyrene dissolved in trichloroethylene, and 20 parts of acetylene soot. It is advantageous to use an active carbon powder from which, prior to application, the coarsest parts have been removed, for instance, by screening. Excellent results have been achieved by sifting this carbon powder through a screen with meshes having an opening of 200 microns and by throwing the residue back on the screen. The component parts are mixed until as homogeneous a paste as possible is produced. This paste is then compressed in a mold at pressures that can be selected from 200 to 1,400 kg./cm.$^2$, preferably 800 kg./cm.$^2$. The result is a pellet that may have a thickness from 2 to 8 millimeters and preferably 4 millimeters. The pellet prepared in this manner is air-dried for a period of 48 hours so as to evaporate the trichloroethylene. Parts are by weight. The pellet is then coated with a 0.03 to 0.04 mm. thick porous silver film through dipping preferably of one of its faces only into a 50% silver nitrate solution and subsequently into a 50% hydrazine solution. This operation may be repeated 3 to 8 times; thereafter, the pellet is washed in distilled water and air-dried. It can be noted immediately that the silver will deposit on the surface dipped into it only since the silver nitrate and hydrazine solutions cannot penetrate into the interior of the pellet whose pores are waterproofed by the coating material. It is obvious that the amount of silver deposited will depend on the strength of the silver nitrate impregnating solution for a given volume (the impregnated volume), the reducing solution (hydrazine) being sufficiently concentrated and consequently active until the silver salt solution has been completely used up. Nevertheless, if the reducing solution is sufficiently diluted, thus having a limited reducing power, only part of the silver will be precipitated and the residue, still in the salt form, will disappear during washing. The quantity of silver deposited will consequently be limited.

The performances of the electrode can be still further improved by improving its conductibility. To that end, metal wires, for instance, of silver, can be incorporated into the initial paste intended for the manufacture of the pellet.

EXAMPLE II

A nickel carbonyl pellet 10 of 2 to 8 mm. thickness sintered similar to the sintered support of conventional accumulator plates is used. The pores do not have to be fine ones.

This pellet 10 is arranged in a device (FIG. 2) designed as follows: It forms a cylinder 11 having the diameter of the pellet 10 and is divided by the latter into upper and lower parts. A given gas pressure $p$ is applied to the lower part of the pellet 10. A solution, for instance, polystyrene in trichloroethylene solvent in the above-prescribed proportions is then poured into the upper part. The pressure $p$ is computed so as to balance the capillary forces inside the pellet 10 in such a way that the solution will impregnate only a certain depth of the said pellet. After a period of time adequate to let the solution penetrate fully up to the desired depth from the top surface down, the pressure $p$ is increased sufficiently to drive off the excess liquid solution. Also, the temperature of the pressure gas is increased so that the solvent of the impregnated solution evaporates from the pellet leaving the polystyrene on the walls of the pores of the impregnated portion of said pellet. It should be pointed out that since the greatest amount of solution had been impregnated into the largest pores of the pellet, the latter are those having the most effective waterproof coating, and since they are the ones most likely to be immersed in the electrolyte of the fuel cell, the advantage of this process becomes apparent.

The pores in the pellet 10 may be uniform, or preferably the electrode pellet may be made up of two layers 10a and 10b of different porosities with a combined thickness of 2–4 mm. The process of manufacture of such electrodes is already known. It may be carried out as follows: Over a first layer of rather large-sized nickel carbonyl particles is applied a second layer of smaller-sized nickel carbonyl particles. Sintering is carried out, possibly following a slight compression of the layers. As a result, a pellet 10, with two layers 10a and 10b of different porosities is formed. If a pellet 10 produced in this manner is mounted into the above-mentioned device 11 with the coarsest pores of layer 10a as the lower section and if a pressure $p$ is applied to the under face of layer 10a, the result is that solely the layer 10b of finer pores is impregnated by the solution and the desired waterproofed electrode pellet 10 results.

For impregnation of the waterproofed pellet 10 by the silver salt, it may then be immersed entirely into the bath, without taking any precautionary measures, in view of the fact that the part that has been previously impregnated by the polystyrene solution and is thus coated with polystyrene has become waterproof and does not internally impregnate itself further. However, if it is not desired to have a complete surface deposit all around the pellet, for instance, of a silverplating, then the waterproofed surface is not immersed in the plating solution. The bath for the catalytic coating may, for instance, be a silverplating bath consisting of a silver nitrate solution, into which the complete pellet or only one surface thereof is dipped. The pellet is dipped into a reducing solution of, e.g. hydrazine. The entire section that has not been waterproofed and has been dipped into the plating solution will then be coated with a layer of active silver.

The concentrations of the various solutions used are:

| | Percent solution |
|---|---|
| Coating solution: | |
|     Polystyrene in trichloroethylene | 10 |
| Silver plating solution: | |
|     Silver nitrate | 50 |
| Reducing solution: | |
|     Hydrazine | 50 |

EXAMPLE III

In another embodiment, the electrode section of an electrode intended to be situated on the electrolyte side is a fuel cell made up of a sintered layer of active metal such as silver or nickel. A paste consisting of particles of the same active metal and the aforementioned solution of polystyrene in, for example, trichloroethylene is prepared. This paste is applied over the sintered section of the electrode and the entire unit is then heated to evaporate the solvent, e.g. trichloroethylene. The polystyrene then acts as a binding agent at the interfaces between the two parts as well as between the particles of the waterproofed section.

The process of this invention relates to the manufacture of porous electrodes intended to be used especially, though not exclusively, in fuel cells and similar devices and consists in partial waterproofing of the electrode. In accordance with one embodiment described above, the desired waterproofing effect is achieved by means of partially coating the grains forming the electrode with a thin layer of a suitable material, e.g., a synthetic material such as polystyrene, or by the depositing of a similar layer on the walls of the pores of an already formed electrode. In the first case, the synthetic material acts as a binding agent of the grains making up the electrode.

In the event the electrode consists of active carbon, coating of the grains of carbon can be achieved by mixing them in a solution of the selected synthetic material and by allowing the solvent to evaporate under suitable conditions so that a thin and finely porous deposit of this material may form on the grains. The electrode is suitably then coated on one surface, for instance, with a layer of a material or a metal having catalytic properties, e.g. silver, this layer being wettable as has been described.

It is a further object of the present invention to obtain the greatest possible number of active centers in the active carbon as well as in the catalytic layer, if any.

EXAMPLE IV

In accordance with one characteristic of the present example, preferably a solvent is used whose affinity for active carbon from the viewpoint of chemical absorption chemisorption is the lowest possible. To accomplish this, the solvents are used that are free from double bonds and are also non-halogenated solvents.

There are many polystyrene solvents, among which are: the aromatic hydrocarbons, the chlorinated hydrocarbons, certain ketones and the organic acetates in general.

By way of example, it is possible to use ketones, especially methylethyl ketone. Compared to trichloroethylene, this solvent offers the advantage of lacking a double ethylene bond and of being devoid of any halogen. Indeed, it is well known that the double bonds and the chlorine of trichloroethylene attach themselves very strongly to the active centers of the carbon. In consequence, the trichloroethylene is very strongly absorbed on the active carbon and blocks out a considerable number of catalytic centers. However by using a solvent in accordance with this example, practically all the catalytic centers of the active carbon are preserved.

According to another characteristic of this example, the silver plating after waterproofing has been effected is carried out in an acid solution, for instance, in an aqueous silver nitrate solution in a normal nitric acid medium. The silver deposit on the electrode is thereby provided with a greater active surface, a material improvement.

This improvement is brought about by an increase in the number of active centers. In an acid medium, a very great number of silver germs are formed that grow little and maintain their activity intact.

The graphs of FIGURES 3 and 4 show the improvement given solely by way of example:

On the graph of FIGURE 3, the abscissa indicates the current density in milliamperes per sq. cm. and, the ordinate, the polarization potential in millivolts. The curve B pertains to an electrode produced by using trichloroethylene as the solvent while curve C relates to an electrode obtained by using a preferred Example IV solvent, namely, methylethyl ketone. By comparison, it can be seen that, at a potential of 150 mv., using methylethyl ketone as a solvent, a current density of 225 ma./sq. cm., is obtained instead of 135 ma./sq. cm. obtained when using trichloroethylene.

The preparation of the electrode utilizing methylethyl ketone solvent is identical to that making use of trichloroethylene. Thus, for instance, one may prepare a paste made up of active carbon powder, polystyrene dissolved in methylethyl ketone, and acetylene soot in the same proportions and same solution strengths. This paste is then compacted and elements or pellets are formed which are dried until complete evaporation of the methylethyl ketone (under well-defined conditions so as to provide a slow evaporation) occurs. Following this, then the said pellets are dipped into a solution of a silver salt, such as, e.g. silver nitrate 50% solution, and then into a hydrazine 50% solution; this treatment is preferably repeated several times. Eventually the pellets treated in this manner are washed and dried. Evaporation is preferably being carried out in a vacuum maintained at a temperature of around 50–60° C.

The graph of FIGURE 4 is also plotted with current density along the abscissa and the polarization potential along the ordinate, using the same units as FIGURE 3. The curve C thereof, corresponding to curve C of FIGURE 3, pertains to an electrode whose silver plating was carried out in a medium having a pH of 3, whereas the curve D thereof corresponds to an electrode whose silver-plating was carried out in an aqueous silver nitrate solution in a normal nitric acid medium. The results produced with this latter electrode are far superior to those of the former. At an electrode polarization potential of 150 mv. a current density of 260 ma./sq. cm. is obtained instead of 225 ma./sq. cm., that is, a gain of 15 to 20%—compared to a result, in itself already excellent—is achieved.

The invention as well as applying to fuel cell electrodes likewise relates, as new industrial products, to electrodes for dry cells produced in accordance with the above-mentioned examples and to dry cells utilizing such electrodes.

The invention is, of course, in no way limited to the exemplified embodiments nor to the particular examples described in more detail herein, which were given by way of example only, but appertains to all variants thereof within the scope of the appended claims. There is no intention of limitation to the exact disclosure herein made.

What is claimed is:

1. A process for the manufacture of an electrode for electrolytic cells comprising preparing a paste comprising a mixture of approximately 100 parts by weight of powdered active carbon of selected particle size, 90 parts by weight of an approximately 10% solution of polystyrene in a vaporizable solvent and 20 parts by weight of acetylene soot, molding the paste under pressure of from 200 to 1400 kg./cm.$^2$ into a pellet having a thickness of about 2 to 8 mm., drying the molded pellet to evaporate the solvent therefrom for a period of about 48 hours and thereafter applying a silver coating to at least one surface of the dried pellet to a thickness of approximately 0.03–0.04 mm.

2. A process for the manufacture of an electrode for electrolytic cells comprising allowing a waterproofing solution of polystyrene in a vaporizable solvent to penetrate a sintered porous electrode pellet via one surface of the latter to a prescribed depth under control of pressure of a gaseous medium applied to an opposite surface of the pellet, said pressure being maintained at a value sufficient to balance capillary forces in the pores of the pellet so as to limit impregnating penetration of the solution to a prescribed depth of the pellet, thereafter increasing said pressure to expel excess solution from the pellet and also increasing the temperature of the gaseous medium to evaporate the solvent of said solution and leaving a waterproofing synthetic material deposit on walls of the pores of said pellet which were impregnated by said solution and thereafter applying a silver layer deposit to the portions of the pellet which are free of said waterproofing solution.

3. A process for preparing an electrode for electrolytic cells comprising effecting impregnating penetration into a sintered porous electrode pellet to a prescribed depth of a solution of polystyrene dissolved in a vaporizable solvent, thereafter evaporating the solvent from the impregnant to leave a deposit of waterproofing material on walls of the pores of said pellet penetrated and impregnated by said solution, and thereafter depositing a metallic catalytic layer to portions of the pellet which are free of said deposit of waterproofing material.

4. A process for preparing an electrode for electrolytic cells comprising applying to a sintered body of active metal of the group consisting of silver and nickel a paste layer comprising a mixture of powder grains of said active metal and a solution of polystyrene dissolved in a vaporizable solvent and then evaporating the solvent from said layer on said body to make it porous with a deposit on its powder grains of said waterproofing material which bind the grains together and which also at the interface between the layer and the body bonds the two together.

5. A process for the manufacture of an electrode for electrolytic cells comprising preparing a paste comprising a mixture of approximately 100 parts by weight of powdered active carbon whose particles are capable of passing 200 micron mesh openings in a screen, 90 parts by weight of an approximately 10% solution of polystyrene in a vaporizable solvent selected from the group consisting of aromatic hydrocarbons, chlorinated hydrocarbons, ketones and organic acetates, molding the paste under pressure of from 200 to 1400 kg./cm.$^2$ into a pellet having a thickness of about 2 to 8 mm., drying the molded pellet to evaporate the solvent therefrom for about 48 hours, thereafter repetitively dipping at least one surface of the molded dried pellet 3–8 times successively into a silver salt plating solution in an acid medium and into a reducing solution until a porous silver layer approximately 0.03 to 0.04 mm. is deposited on the said surface and thereafter washing and drying said pellet.

6. The process according to claim 5 wherein the chlorinated hydrocarbon is trichloroethylene and wherein the silver salt plating solution is 50% silver nitrate in a normal nitric acid medium and wherein the reducing solution is 50% hydrazine.

7. A process for preparing an electrode for electrolytic cells comprising applying to a sintered body of active metal of the group consisting of silver and nickel a paste layer comprising a mixture of powder grains of said active metal and a solution of polystyrene waterproofing material in a vaporizable solvent of the group consisting of aromatic hydrocarbons, chlorinated hydrocarbons, ketones and organic acetates so that the composite thickness of the body and the paste layer is between 2 to 8 millimeters, and then evaporating the solvent from said layer on said body to make it porous with a deposit on its powder grains of said polystyrene which waterproofs them, binds them together and also at the interface between the layer and body bonds the two together.

8. A process for preparing an electrode for electrolytic cells comprising providing a sintered electrode pellet body having two layers of different porosities, impregnating the layer of finer porosity with a solution of polystyrene waterproofing material in a vaporizable solvent, then evaporating the solvent from the impregnated solution and thereafter depositing a layer of metal catalytic agent to the layer of coarser porosity which is free of waterproofing material.

9. A process of preparing an electrode for electrolytic cells comprising providing a layer of relatively large-sized nickel carbonyl particles, applying thereto a second layer of smaller-sized nickel carbonyl particles, compressing the layers and sintering them together to provide a pellet having coarse and finer pored layers, impregnating the finer pored layer with a waterproofing solution of polystyrene in a vaporizable solvent selected from the group consisting of aromatic hydrocarbons, chlorinated hydrocarbons, ketones and organic acetates, then evaporating the solvent from the impregnant, thereafter repetitively dipping at least the coarser pored layer of the pellet into a silver plating bath and into a reducing bath to effect deposit of a silver coating on the coarser pored layer and thereafter washing and drying the pellet.

10. A process for preparing an electrode for fuel cells and the like which comprises forming an electrode body of a porous granular conductive material, impregnating at least a portion of said electrode body with a solution of polymeric waterproofing material in a volatile solvent, evaporating said solvent and thereby waterproofing the impregnated portion of said electrode body, immersing at least one outside surface of said electrode in a solution of a salt of a catalytic active metal, and reducing said salt to form said catalytic active metal as a finely divided microporous non-waterproof deposit on the immersed outside surface of said electrode.

11. A process according to claim 10 in which said polymeric material is polystyrene.

12. A process according to claim 10 wherein said granular material is carbon.

13. A process according to claim 10 wherein said granular material is sintered nickel.

14. A process according to claim 10 wherein said solvent is trichloroethylene.

15. A process according to claim 10 wherein said solvent is methylethyl ketone.

16. An electrode for use in a fuel cell and the like comprising a coherent body of porous granular conductive material, at least a portion of said electrode being waterproofed with a polymeric material, and a thin coating of finely divided non-waterproof microporous chemically deposited particles of a catalytic active metal on at least one outside surface of said electrode.

17. An electrode according to claim 16 in which said polymeric material is polystyrene.

18. An electrode according to claim 16 wherein said granular material is carbon.

19. An electrode according to claim 16 wherein said granular material is sintered nickel.

20. An electrode according to claim 16 wherein said catalytic active metal is silver.

21. An electrode according to claim 16 wherein said thin coating layer of catalytic active metal is about 0.03 to 0.04 mm. thick.

22. An electrode for fuel cells and the like comprising a coherent body of a porous conductive granular material, a portion of said electrode being waterproofed with polystyrene, the non-waterproofed portion of said electrode having a thin layer of finely divided granular microporous non-waterproof chemically deposited catalytic active metal selected from the group consisting of Group VIII metals and silver on the surfaces of said electrode.

23. A process for the manufacture of an electrode for fuel cells and the like comprising preparing a paste comprising finely divided carbon and a solution of polystyrene in a volatile organic solvent, molding said paste into a coherent electrode body under pressure, drying the molded body to evaporate the solvent, thereafter immersing at least one surface of the dried molded body in a solution of a salt of a catalytic active metal, and reducing said salt to deposit said catalytic active metal in finely divided microporous granular form on the immersed surface.

(References on following page)

References Cited

UNITED STATES PATENTS

| | | | |
|---|---|---|---|
| 1,601,036 | 9/1926 | Nyberg | 136—121 |
| 2,017,280 | 10/1935 | Heise et al. | 136—121 |
| 2,384,463 | 9/1945 | Gunn et al. | 136—86 |
| 2,641,623 | 6/1953 | Winckler et al. | 136—122 |
| 2,863,762 | 12/1958 | Pullen | 75—108 |
| 2,945,757 | 7/1960 | Hockstra | 75—108 |
| 3,009,979 | 11/1961 | Corren et al. | 136—67 |
| 3,077,507 | 2/1963 | Kordesch et al. | 136—120 |
| 3,097,974 | 7/1963 | McEvoy et al. | 136—120 |
| 3,098,762 | 7/1963 | Roblee et al. | 136—120 |
| 3,098,772 | 7/1963 | Taschek | 136—86 |
| 3,116,170 | 12/1963 | Williams et al. | 136—120 |
| 3,117,034 | 1/1964 | Tirrell | 136—86 |
| 3,134,697 | 5/1964 | Niedrach | 136—86 |
| 3,193,414 | 7/1965 | Emeriat | 136—122 |

FOREIGN PATENTS

| | | |
|---|---|---|
| 576,578 | 5/1959 | Canada. |
| 871,950 | 7/1961 | Great Britain. |

JOHN H. MACK, *Primary Examiner.*

W. VAN SISE, *Assistant Examiner.*